United States Patent
Cha et al.

(10) Patent No.: US 9,615,217 B2
(45) Date of Patent: Apr. 4, 2017

(54) CELLULAR BROADCAST MESSAGE FORWARDING

(71) Applicant: Apple Inc., Cupertino, CA (US)

(72) Inventors: Hyun Joon Cha, Mountain View, CA (US); Chang Kee Lee, San Jose, CA (US); Sang Ho Baek, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 13/865,277

(22) Filed: Apr. 18, 2013

(65) Prior Publication Data

US 2014/0315511 A1    Oct. 23, 2014

(51) Int. Cl.
*H04W 4/06* (2009.01)

(52) U.S. Cl.
CPC ..................... *H04W 4/06* (2013.01)

(58) Field of Classification Search
CPC . H04W 76/007; H04W 72/005; H04W 68/00; H04W 88/02; H04W 28/18; H04W 84/12; H04W 76/023; H04W 76/02; H04W 48/18; H04W 52/0209; H04W 4/005
USPC .............. 455/41.2, 404.1, 566, 574, 41.1
See application file for complete search history.

(56) References Cited

U.S. PATENT DOCUMENTS

| | | | |
|---|---|---|---|
| 7,505,795 B1* | 3/2009 | Lim et al. ................ 455/574 |
| 7,512,685 B2* | 3/2009 | Lunsford ............ H04L 12/5692 455/41.2 |
| 8,010,164 B1 | 8/2011 | Sennett et al. |
| 8,078,230 B2* | 12/2011 | Schuler et al. ............... 455/566 |
| 8,200,183 B2 | 6/2012 | Aftelak et al. |
| 8,368,530 B1 | 2/2013 | Zhang et al. |
| 8,385,956 B2 | 2/2013 | Sennett et al. |
| 2009/0239497 A1* | 9/2009 | Sennett et al. ............ 455/404.1 |
| 2009/0247111 A1 | 10/2009 | Sennett et al. |
| 2011/0252240 A1* | 10/2011 | Freedman et al. ............ 713/169 |
| 2012/0238208 A1* | 9/2012 | Bienas .................... H04W 8/24 455/41.2 |
| 2013/0066984 A1* | 3/2013 | Shin .................... H04L 12/1854 709/206 |
| 2013/0217320 A1* | 8/2013 | Jacobs .................... H04W 4/22 455/7 |
| 2014/0179231 A1* | 6/2014 | Charania et al. ............ 455/41.2 |

* cited by examiner

*Primary Examiner* — Lester Kincaid
*Assistant Examiner* — Gary Lafontant
(74) *Attorney, Agent, or Firm* — Meyertons Hood Kivlin Kowert & Goetzel, P.C.; Jeffrey C. Hood (57) ABSTRACT

Distributing messages received by a cellular device via cellular broadcast to additional electronic devices. The cellular device may receive a first message via a cellular broadcast technique. The cellular device may discover another electronic device. The cellular device may provide an indication of the first message to other electronic device. The indication of the first message may cause the other electronic device to provide a user alert at the other electronic device.

20 Claims, 4 Drawing Sheets

CELLULAR BROADCAST MESSAGE FORWARDING

FIELD

The present disclosure relates to wireless devices, and more particularly to a system and method for a wireless device to distribute indications of messages received via cellular broadcast to additional devices.

DESCRIPTION OF THE RELATED ART

Wireless communication systems are rapidly growing in usage. Further, wireless communication technology has evolved from voice-only communications to also include the transmission of data, such as Internet and multimedia content. As use of wireless communication technology has proliferated, an ever increasing number of devices are being provided with wireless communication capability, such that it is common for a user (or group of users, such as a family) to possess multiple wireless devices.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.), may be capable of cellular communication as well as Wi-Fi communication. Other wireless devices (such as some tablets, portable media players, etc.) may be capable of Wi-Fi communication but not cellular communication.

In many countries, emergency alert systems are used to provide various notifications to the public, such as notifications of severe weather events (tornadoes, flash floods, tsunamis, etc.), AMBER alerts, imminent threat alerts, presidential messages, etc. Such emergency alert systems may utilize a variety of communication techniques, including wireless communication techniques, to distribute such notifications. As one example, in the United States, the Emergency Alert System (EAS) includes the commercial mobile alert system (CMAS) and wireless emergency alert (WEA) standard. According to these systems, cellular broadcast techniques such as short message service—cellular broadcast (SMS-CB) may be deployed to distribute emergency alert messages to cellular devices in targeted geographical areas.

As noted above, it may be possible that a user (or group of users) might have a number of wireless devices, among which at least one functions as a cellular telephone, while at least one does not have cellular communication capability. In such a case, messages distributed to the cellular telephone via cellular broadcast may not be distributed to those devices which do not have cellular communication capability. However, at least on some occasions, a user may have a wireless device without cellular communication capability readily available (e.g., if the user is reading on a tablet or watching content on a media player, among various possibilities) but not a cellular telephone (e.g., if the cellular telephone is charging on a docking station, among various possibilities). If an emergency alert (or other cellular broadcast) message is distributed to the cellular phone via cellular broadcast on such an occasion, the user may not immediately be notified of the alert. Since such alerts may commonly include time-critical content (e.g., notifications of imminent severe weather events), significant negative consequences (e.g., injury, death, property damage, etc.) may result from failed or even delayed delivery of such alerts to users. Accordingly, improvements in wireless devices and wireless communication techniques would be desirable.

SUMMARY

In light of the foregoing and other concerns, it would be desirable to provide a way for a wireless user equipment (UE) device with cellular communication capability to forward indications of cellular broadcast messages to other (e.g., non-cellular communication capable) devices with which it is able to communicate, and to provide a way for those other devices to alert users of those cellular broadcast messages in response to receiving indications thereof.

Accordingly, embodiments are presented herein of a method for a UE to provide indications of cellular broadcast messages to additional devices, and a UE configured to implement the method. The UE may include one or more radios (e.g., including at least a cellular radio), including one or more antennas, for performing wireless communications. The UE device may also include a processing element configured to implement part or all of the method (e.g., by executing program instructions). In addition, the UE device may include a non-transitory computer accessible memory medium, which may store program instructions executable by the UE.

Additionally, embodiments are presented herein of a method for an electronic device to provide a user alert based on receiving an indication of a cellular broadcast message from a UE, and an electronic device configured to implement the method. The electronic device may include one or more radios (but may not include a cellular radio), including one or more antennas, for performing wireless communications. The electronic device may also include a processing element configured to implement part or all of the method (e.g., by executing program instructions). In addition, the electronic device may include a non-transitory computer accessible memory medium, which may store program instructions executable by the electronic device.

The methods presented herein may be particularly relevant with respect to emergency alert messages distributed via cellular broadcast techniques. For example, by providing cellular capable UE devices with the ability to forward such messages, and non-cellular capable devices with the ability to receive indications of such messages and alert users of such messages, the reach of such messages may be significantly increased. This may in turn improve the ability of users of such devices to respond to the content of such messages in a timely manner, thereby potentially avoiding or mitigating negative effects which might otherwise be likely. For example, if an emergency alert message indicating an imminent tsunami is distributed, additional seconds or minutes to respond (e.g., to move to higher ground) provided by more timely receipt of the emergency alert message (such as might be gained according to the methods presented herein) may be critical to the health and well-being of a user of devices by which the emergency alert message is received.

The actual techniques used to implement the cellular broadcast forwarding features described herein may include any of a variety of features, and may depend on available communication methods, device types, device capabilities, user configuration settings, and various other considerations.

For example, a cellular device might provide an indication of a received cellular broadcast message to another device without providing the content of the cellular broadcast message. Alternatively, the cellular device might provide an indication which includes part or all of the received cellular broadcast message. The nature of the indication may depend, for among various possibilities, on default settings and/or user configured settings, device type(s) and capabilities, etc.

As another example, a cellular device might provide an indication of a received cellular broadcast message to another device by way of a wireless local area network (WLAN) such as might be provided by a base station operating according to Wi-Fi (IEEE 802.11). Alternatively, or in addition, a peer-to-peer communication technique might be utilized, such as Wi-Fi peer-to-peer, Bluetooth, near field communication (NFC), and/or any of various other wireless communication techniques may also or alternatively be used. Further, in some cases wired communication may be utilized for part or all of the communication between the cellular device and the additional device. For example, a universal serial bus (USB) or Ethernet link (among various possibilities) might link the cellular device to the additional device.

Furthermore, it may be possible to configure a cellular device to provide an indication of a cellular broadcast message to another device via a wide area network, in some cases, if desired. For example, in case a user wants a friend or relative (e.g., parent, spouse, child, etc.) to be notified if an emergency alert is distributed to the user's cellular device, the cellular device may be configured (e.g., via user input, such as by entering an IP address of the target device) to distribute indications of cellular broadcast messages to additional devices via a wide area network.

As another example, the manner in which an alert based on a cellular broadcast message is provided at a target device may depend on the type of device, what services it is capable of providing, and/or what services it is currently providing. For example, an audio device might modify volume of or mute audio which is currently being rendered as part of an alert. The audio device might also or alternatively render an audio portion of the cellular broadcast message, and/or provide text-to-speech services (e.g., provide an audio rendering of a textual portion of the cellular broadcast message). A video device might pause or modify a currently displayed image as part of an alert. The video device might also or alternatively display a textual portion of the cellular broadcast message. A printing device might print a textual portion of the cellular broadcast message. Other manners of providing an alert are also possible.

Substantial additional benefits and convenience may be provided by way of enabling user configuration capabilities. For example, a user might be provided with a user interface (e.g., at either or both of the cellular device and a device which is being configured to receive indications of cellular broadcast messages) to indicate user-preferred features of a cellular broadcast message forwarding policy specific to a particular device. Such features might include whether or not to forward any cellular broadcast messages, and/or specific types/classes of cellular broadcast messages (e.g., weather alerts, traffic alerts, imminent threat alerts, etc), to the device; types of indications to provide for all or various specific types/classes of cellular broadcast messages; whether or not to wake the device to provide all or various specific types/classes of cellular broadcast messages if the device is sleeping when a cellular broadcast message is received; and/or any of various other features.

As noted above, providing cellular devices with the ability to distribute cellular broadcast messages to other devices, and providing those other devices with the ability to alert users of those cellular broadcast messages, may substantially extend the reach of those cellular broadcast messages. This may significantly benefit all users, and in particular users with disabilities limiting one or more sensory capabilities, by extending the audibility and visibility of emergency alerts distributed by way of such cellular broadcast messages, particularly if the other devices are not provided with alternate means of receiving emergency alert messages.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
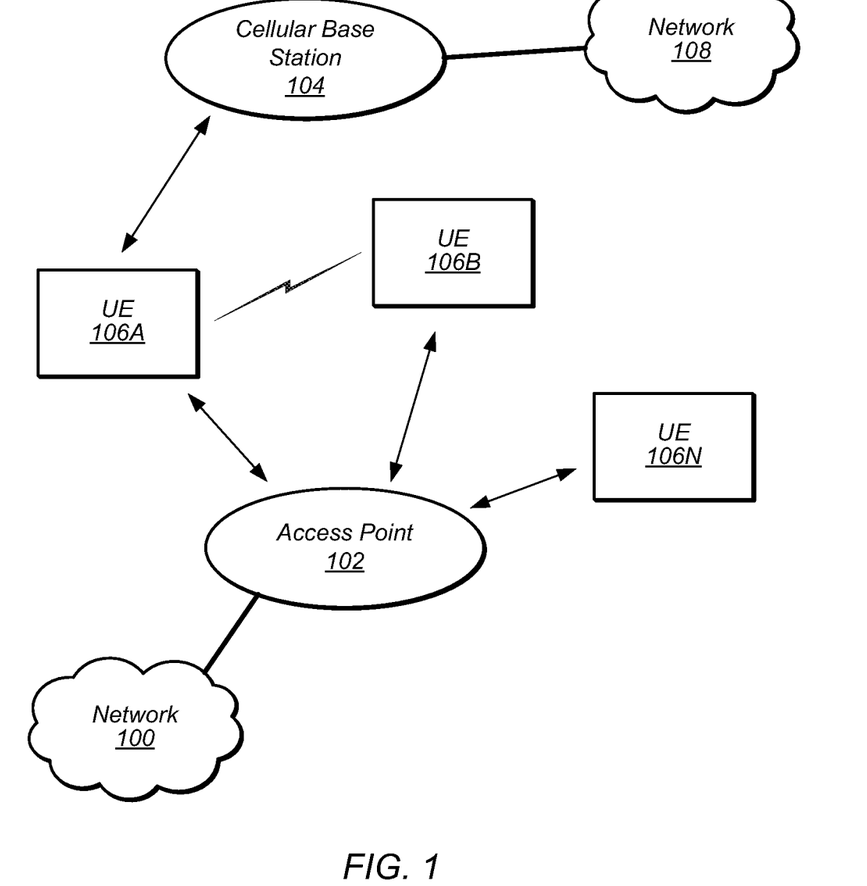
FIG. 1 illustrates an exemplary (and simplified) wireless communication system.
Figure 2:
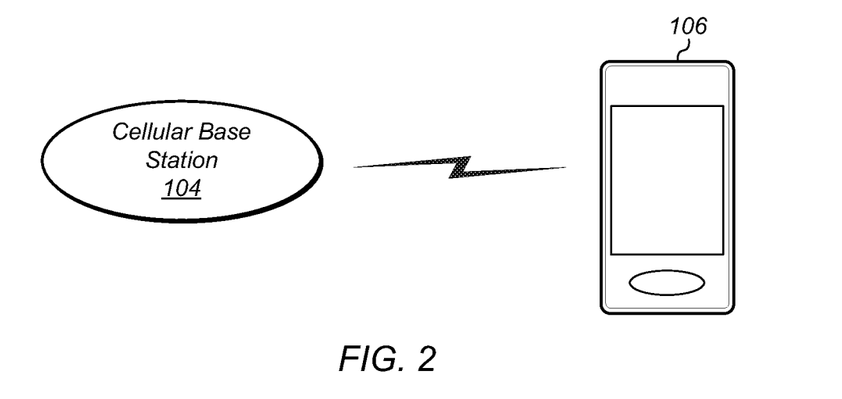
FIG. 2 illustrates a base station (BS) in communication with a user equipment (UE) device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106-1 through 106-N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

As shown, multiple UEs 106 (e.g., UE 106A and UE 106B) may also be configured to communicate directly with each other, e.g., using a peer-to-peer wireless communication protocol. For example, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

In addition, at least one UE 106 (e.g., UE 106A) may be configured to communicate with a base station 104. The base station 104 may be a base transceiver station (BTS) or cell site (a "cellular base station"), and may include hardware that enables wireless communication with UEs 106 according to one or more cellular communication protocols. The UE 106 and the cellular base station 104 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 108. In particular, the cellular base station 104 may provide UEs 106 with various telecommunication capabilities, such as voice and SMS services (e.g., typically via circuit-switched wireless links) and/or data services (e.g., typically via packet-switched wireless links). In particular, the cellular base station 104 may provide cellular broadcast services (e.g., via SMS-Cellular Broadcast or SMS-CB) to UEs 106, which may be used to distribute emergency alert messages among various possibilities.

A UE 106 may be capable of communicating using multiple wireless communication standards. For example, the UE 106 may be configured to communicate using at least one wireless networking (e.g., Wi-Fi) and/or peer-to-peer wireless communication protocol (e.g., BT, Wi-Fi peer-to-peer, etc.) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 104. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, Wi-Fi, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios or radio components which are shared between multiple wireless communication protocols, and one or more radios or radio components which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible.

Figure 3:
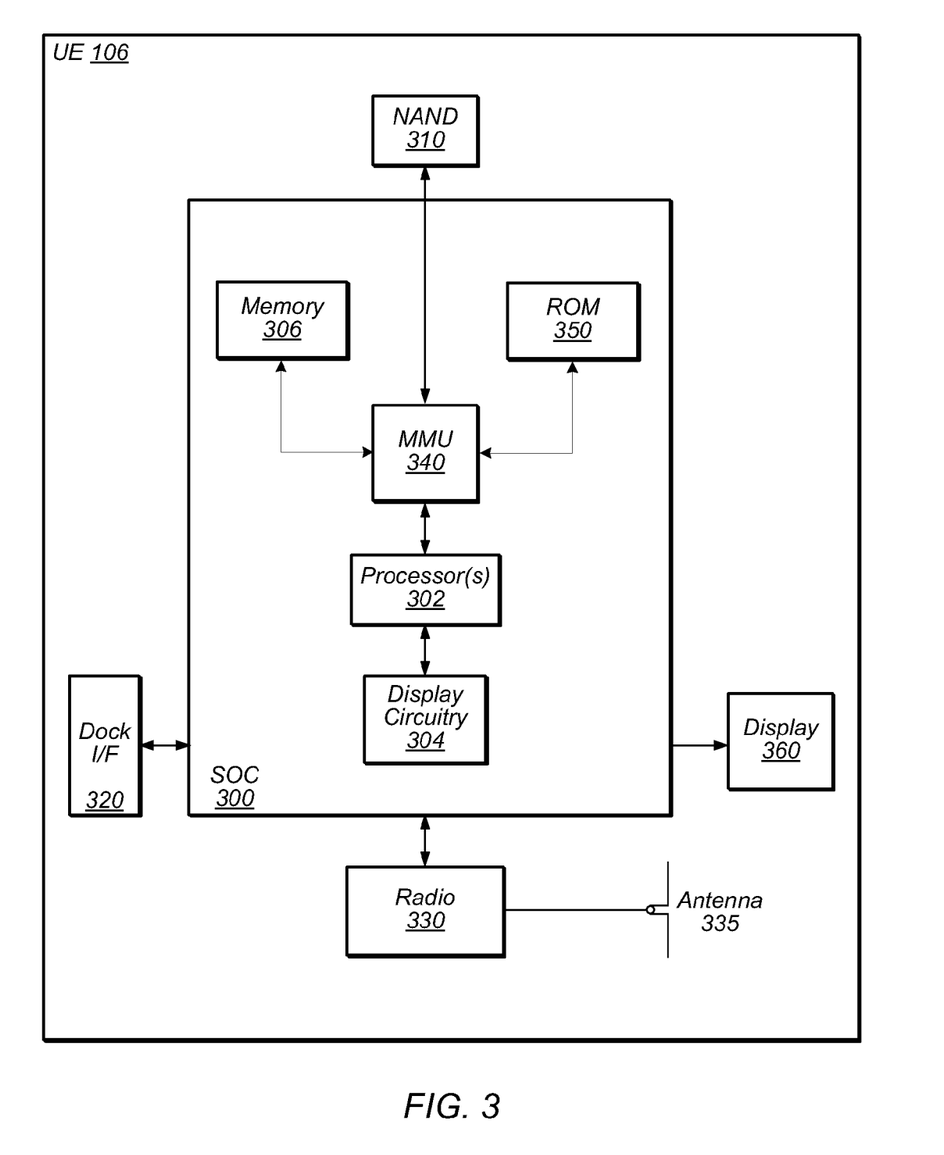
FIG. 3 illustrates an exemplary block diagram of a UE device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (or "radio") 330 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
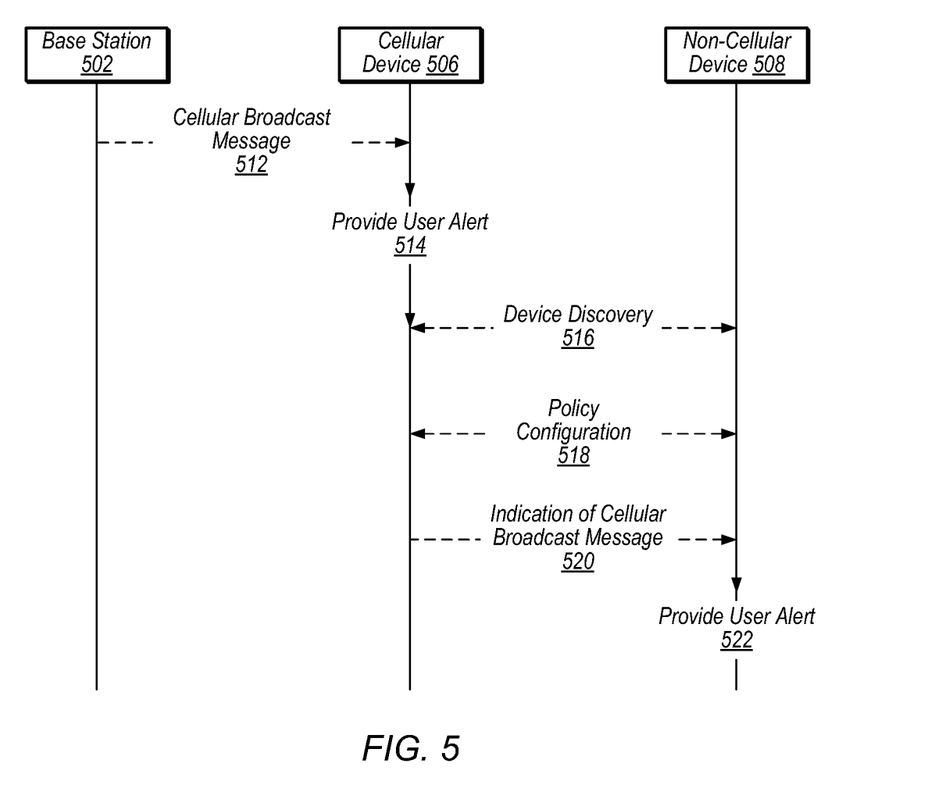
FIG. 5 is a flowchart/communication diagram illustrating aspects of a technique for distributing a cellular broadcast message from a cellular device to a non-cellular device.

As described herein, the UE 106 may include hardware and software components for implementing features for distributing messages received at the UE 106 via cellular broadcast to another device, such as those described herein with reference to, inter alia, FIG. 5 and/or FIG. 6. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5 and/or FIG. 6.

Figure 4:
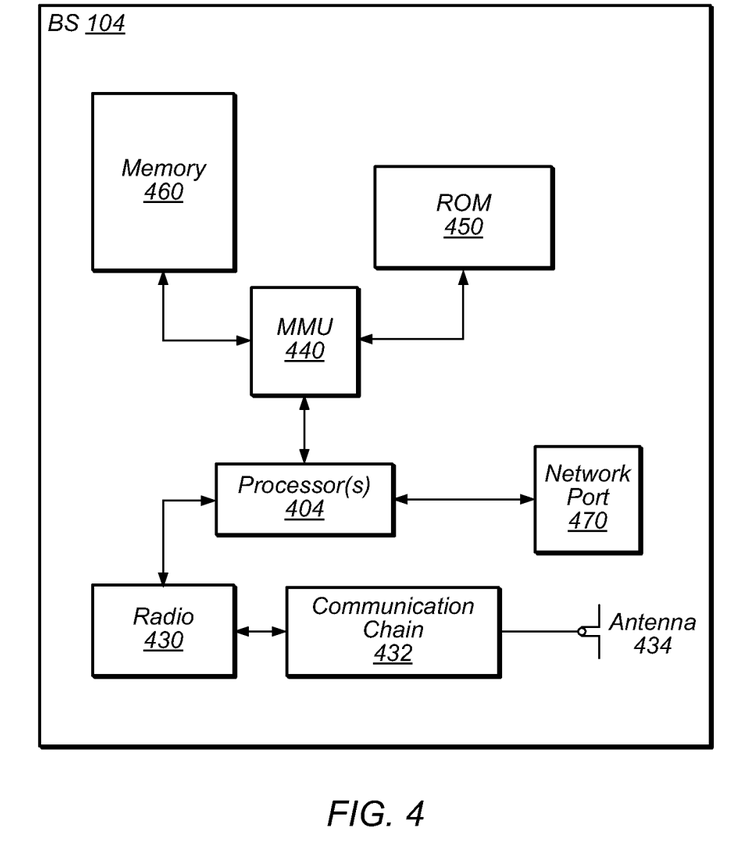
FIG. 4 illustrates an exemplary block diagram of a BS.

FIG. 4—Exemplary Block Diagram of a Base Station

FIG. 4 illustrates an exemplary block diagram of a cellular base station (BS) 104. It is noted that the base station of FIG. 4 is merely one example of a possible base station. As shown, the base station 104 may include processor(s) 404 which may execute program instructions for the base station 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 104 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The base station 104 may also be coupled to an Emergency Alert System (EAS) via the network port 470, by which means the base station may receive emergency alert messages to distribute to cellular devices via cellular broadcast.

The base station 104 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 104 may be configured to support provision by a UE 106 of messages received via cellular broadcast to other devices (e.g., devices without native cellular communication capabilities). In particular, as described further subsequently herein, the BS 104 may include hardware and software components for implementing (or for use in conjunction with a UE 106 implementing) part or all of a method for a UE 106 to provide indications of messages received by the UE 106 by way of cellular broadcast techniques to another device.

The processor 404 of the base station 104 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIGS. 5-6—Flowcharts

Currently, a primary technique for distributing emergency alert messages includes the use of cellular broadcast messages. For example, an entity such as the Federal Emergency Management Agency (FEMA) in the United States, and similar entities in other countries, may be authorized to generate and distribute emergency alert messages to wireless carriers (e.g., cellular service providers), which may in turn distribute those emergency alert messages to cellular-capable devices which monitor compatible cellular broadcast channels via cellular broadcast techniques. An example of a cellular broadcast technique is the short message service—cellular broadcast (SMS-CB) format. An emergency alert SMS-CB message may include a text portion, and may include and/or cause a cellular device to use a unique ring tone and/or vibration to alert a user of the message. In some cases, an SMS-CB transmission may be limited in length, though generally multiple SMS-CB transmissions may be used (e.g., concatenated) to effectively transmit a longer emergency alert message if need be.

While many people have cellular devices, not all are always in the vicinity of their cellular devices. For example, at certain times a cellular device may be plugged into a charging station or dock to charge its battery, and/or a user of that cellular device may simply prefer to leave their cellular device in a stationary location, while that user moves about (e.g., around their home) or engages in some other activity such that audibility and/or visibility of the cellular device is limited.

Additionally, many people have multiple electronic devices, some of which may be configured for other forms of wireless communication exclusive of cellular communication (or may be capable of performing cellular communication, but may temporarily have cellular communication disabled, such as when operating in an 'airplane mode').

In other words, it may be common for some users (or groups of users, such as families) to possess multiple devices, of which one or more may include cellular communication capability (e.g., may include cellular communication circuitry/a cellular radio and be configured for cellular telecommunications), while one or more may not be configured for cellular communication (e.g., may not include a cellular radio or other cellular communication circuitry), but may include alternative wireless and/or wired communication capabilities, such as a Wi-Fi radio/circuitry/software.

In some cases, a user may be within audible and/or visible range of non-cellular device even when not within audible and/or visible range of a cellular device. For example, a user might be reading a book on an e-reader or tablet in a different room than their cellular device. As another possibility, a user might be engaged in a video game, or driving a car with loud music, such as might distract from or mask a cellular broadcast alert provided at a nearby cellular device.

Accordingly, it would be desirable to provide cellular devices with techniques for distributing messages received by those cellular devices via cellular broadcast to other devices. It would also be desirable to provide those other devices with techniques for receiving indications of messages received by cellular devices via cellular broadcast and alerting users of those messages.

Accordingly, certain embodiments of the present disclosure relate to a method for a UE device to distribute an indication of a message received via cellular broadcast to another device, and to a method for a device to receive and provide a user alert based on an indication of a message received at a UE device via cellular broadcast. FIG. 5 is a flowchart/communication diagram illustrating such methods. The methods shown in FIG. 5 may be used in conjunction with any of the computer systems or devices shown in the above Figures, among other devices. Some of the method elements shown may be performed concurrently, in a different order than shown, or may be omitted. Additional method elements may also be performed as desired.

FIG. 5 relates, in particular, to a method for a cellular device 506 to distribute an indication of a message received via cellular broadcast from a base station 502 to a non-cellular device 508, and for the non-cellular device 508 to receive an indication of a message received by the cellular device 506 via cellular broadcast and provide a user alert based on that indication. Some aspects of method may be performed by the cellular device 506, while other aspects of the method may be performed by the non-cellular device 508. The cellular device 506 may also be referred to as a wireless user equipment (UE) device, and be any of a variety of devices. A common example may include a smart phone, e.g., which is configured for wireless communication according to one or more cellular communication protocols (e.g., UMTS, LTE, and/or CDMA2000, among various possibilities), Wi-Fi, and Bluetooth, and which is configured to execute a mobile operating system such as iOS™ or Android™. Of course, the cellular device 506 may alternatively be any of a variety of other types of device, as desired, including but not limited to tablet computers, e-readers, portable multimedia players, portable gaming systems, and/or other cellular devices. Alternatively or additionally, the cellular device 506 may be the UE device 106 described above in detail with reference to FIG. 3. The non-cellular device 508 may be any of a variety of mobile or stationary devices, such as a tablet, laptop, or desktop computer, e-reader, portable or stationary multimedia player, portable or console gaming system, set top box, automotive vehicle, etc. Note that the non-cellular device 508 may be a device which is not configured for cellular communication due to being incapable (e.g., lacking required hardware and/or software) to perform cellular communication, or may be a device which is technically capable of cellular communication (e.g., includes hardware and/or software which could enable cellular communication) but which is not configured for cellular communication, for example, as a result of having that capability disabled. As shown, the method may operate as follows.

In 512, the cellular device 506 may receive a first message (a cellular broadcast message) from base station 502 via cellular broadcast. The first message may be an emergency alert message, such as a message providing information relating to an imminent severe weather event such as a tornado, flash flood, tsunami, hurricane, blizzard, etc. Alternatively, the first message may be another type message which is also suitable for cellular broadcast. For example, if desired, cellular broadcast messages providing traffic reports might occasionally or regularly be distributed in a particular geographic (e.g., metropolitan) area. The first message may include information, or be preceded by information (e.g., in a cellular broadcast scheduling message received from base station 502 on a cellular broadcast paging channel) indicating a type or class of cellular broadcast message of the first message, such as "weather", "traffic", "AMBER alert", "presidential message", "imminent threat", etc. Additional or alternative types or classes of cellular broadcast messages are of course also possible.

The cellular device 506 may be configurable with respect to which types of cellular broadcast messages to decode. For example, user input may be received at the cellular device 506 indicating whether or not a user prefers to receive traffic report cellular broadcast messages. In some cases a cellular device 506 may be configured by default to receive and decode certain types of cellular broadcast messages, while ignoring other types of cellular broadcast messages. Further, it may be the case that a cellular device 506 may not be configured to ignore certain types of cellular broadcast messages. For example, it may be desirable as a public safety feature to prevent a user from configuring their cellular device 506 to ignore cellular broadcast messages designated as emergency alert messages.

As noted above, the first message may be transmitted via cellular broadcast techniques. An exemplary cellular broadcast format is the SMS-CB format. Thus, as one possibility, the first message may be transmitted from the base station 502 to the cellular device 506 via SMS-CB transmission. The first message may include a single SMS-CB transmission, or may include the (e.g., concatenated) content of multiple SMS-CB transmissions. The first message may include a textual portion, which may include content such as a timestamp (indicating a time at which the message was generated) and/or duration (e.g., indicating a length of time for which the message is relevant), a description of the reason for the message (e.g., a description of an emergency event), an indication of an area affected by the message, instructions for handling or responding to the reason for the message, and/or various other content portions. The first message may also specify and/or include one or more unique alerting sounds (e.g., ringtones) to be rendered by a device receiving the first message, and/or may cause a device receiving the first message to vibrate. Alternatively, while the first message may not explicitly indicate a specific alerting sound or vibration to be rendered by a receiving device, devices configured to receive cellular broadcast messages (such as cellular device 506) may implicitly or automatically be configured to render cellular broadcast message specific alerting sounds or vibrations when a cellular broadcast message is received.

The cellular device 506 may, in response to receiving the first message, provide a user alert 514. The user alert may include any cellular broadcast message specific alerting sound and/or vibration, and/or may include rendering the content of the first message. Note that the content may either be rendered automatically or in response to user input, such as unlocking a keypad and/or making a menu selection, according to various implementations.

In 516, the cellular device 506 and the non-cellular device 508 may perform device discovery to discover and establish a communication link with each other. The cellular device 506 may discover the non-cellular device 508, or vice versa, via any of a variety of communication techniques. For example, the cellular device 506 and the non-cellular device 508 may discover each other via Wi-Fi communication over a wireless local area network (WLAN) (e.g., via an access point) or via Wi-Fi peer-to-peer communication. Additional possibilities include Bluetooth (including Bluetooth Low Energy (BLE) or Alternate MAC/PHY (AMP)), USB, Ethernet, etc. As the non-cellular device 508 may not be configured for cellular communication it may be the case that the cellular device 506 may not discover the non-cellular device 508 via cellular communication.

The cellular device 506 may discover the non-cellular device 508 (or vice versa) automatically, e.g., via an automatic device and/or service discovery protocol. For example, devices which are connected to a Wi-Fi network (such as a home network, or a network provided by a vehicle) may be able to discover, determine device type(s) and/or characteristics, and establish communication links with each other via an automatic discovery protocol such as Universal Plug and Play (UPnP) or Bonjour.

Alternatively, the cellular device 506 may discover (and/or be discovered by) the non-cellular device 508 manually. For example, a user may provide input to the cellular device 506 indicating an IP address of a targeted non-cellular device 508 (or may provide input to the non-cellular device 508 indicating an IP address of the cellular device 506), by way of which the cellular device 506 may be able to establish a communication link with the targeted non-cellular device 508 (or vice versa) over a local- or wide area network. As another possibility, a user might register the cellular device 506 with a server, at which the non-cellular device 508 is also registered (e.g., by the user or another user, such as a friend or family member). The user might then provide input specifying that cellular broadcast forwarding be provided between the two devices. Subsequently, indications and policy configuration (such as subsequently described herein) might be provided between the cellular device 506 and the non-cellular device 508 via the server.

In 518, a policy may be configured for distributing cellular broadcast messages from the cellular device 506 to the non-cellular device 508. The policy may be automatically configured (e.g., may be a default policy) or manually configured (e.g., may include features selected via user input). The policy may include any of a variety of features relating to potential distribution of cellular broadcast messages (or indications thereof) from the cellular device 506 to the non-cellular device 508. For example, the policy may specify whether or not to provide indications of cellular broadcast messages to the non-cellular device 508 in general, and/or more particularly may specify whether or not to provide indications each of various types or classes of cellular broadcast messages (e.g., traffic, weather, etc.) to the non-cellular device 508. The policy may also or alternatively specify a type of indication to be provided by the cellular device 506 to the non-cellular device 508 for cellular broadcast messages in general, or for each of various types or classes of cellular broadcast messages. A further feature which may be specified by the policy, if desired, could include whether or not to wake the non-cellular device 508 to provide indications of cellular broadcast messages (in general or for each of various types or classes) if the non-cellular device 508 is in a sleeping state. Any of various other features may also or alternatively be specified by the policy.

In some cases, policy options may be based on (e.g., limited by) device type and/or services provided by the non-cellular device 508. For example, the non-cellular device 508 may be any of a variety of types of devices, such as a portable or stationary media player, tablet, e-reader, gaming console, set top box, wearable device (e.g., watch), printer, etc. Thus, in various cases the non-cellular device may or may not be capable of providing various services, such as rendering audio, displaying text or other images, vibrating, printing, etc. Further, different devices may offer varying degrees or capabilities with respect to certain services; for example, some devices with audio rendering capabilities may limited to rendering only a simple single-tone 'beep' sound, while other devices with audio rendering capabilities (such as a device whose primary function is media rendering, e.g., a portable or stationary media player) may be capable of providing a much broader audio rendering range.

Accordingly, depending on device type and available services provided by the non-cellular device 508, certain policy options, such as those relating to how user alerts are generated and provided in response to indications of cellular broadcast messages, may be configured. As one example, a video game console (e.g., coupled to or including a display and/or speakers) might be configured to pause or modify (e.g., flash with modified pixel coloration, overlay a textual message, interrupt game audio to provide alert audio, etc.) an active video game session in response to an indication of a cellular broadcast message. Alternatively, the video game console might be configured to generate and provide a user alert in response to a cellular broadcast message only if no video game session is active, or to provide a user alert in response to a cellular broadcast message only at certain times in an active video game session, or after completion of a current video game session. Further, different types of user alerts may be specified for the non-cellular device 508 in different scenarios, for example based on different types of cellular broadcast messages. Thus, the policy might be configure the non-cellular device 508 to respond in one way (provide a first type of user alert) to one type of cellular broadcast message, and respond in a different way (provide a second type of user alert) to another type of cellular broadcast message. In addition or as an alternative to the above-described exemplary video game console, other types of devices may similarly provide multiple user alert options; for example, a music player might provide options for muting or otherwise modifying volume of current audio in various ways, overlaying an alert sound on current audio, or pausing current audio to render textual content of a cellular broadcast message as text-to-speech audio, among various options.

As noted above, configuration of the policy may be performed automatically, or partially or entirely manually. If manual configuration of at least part of the policy is desired, this may be implemented in any of a variety of ways. For example, as one possibility, the cellular device 506 may provide a user interface by means of which a user may provide user input indicating one or more preferred policy options. The user interface may include a display (e.g., a touch screen display with one or more context menus), one or more microphones and speech recognition/interpretation capabilities, proximity gesture recognition/interpretation capabilities, and/or any of various other possible user interface elements. As another possibility, the non-cellular device 508 may provide a user interface by means of which a user may provide user input indicating one or more preferred policy options. The user interface of the non-cellular device 508 may be similar to or different than a user interface provided by the UE. Thus, the policy may be manually configured by means of user input provided at any of the cellular device 506, the non-cellular device 508, or a combination thereof (e.g., features may be specified or modified at either device).

Note further that in some cases, policy features specified by user input at one of the cellular device 506 or the non-cellular device 508 may be relayed (i.e., transmitted) to the other device, such that both devices may be familiar with the policy. As another possibility, the policy may effectively be stored and implemented at just one of the devices. For example, the policy may be stored and implemented at the cellular device 506, such that indications and alerts in accordance with the policy may be provided to the non-cellular device 508 in a manner that does not require the non-cellular device 508 to actively implement any aspects of the policy. Additionally, in some cases, certain aspects of the policy (for example, determining whether or not to send an indication for a particular cellular broadcast message and a type of indication to provide for that particular cellular broadcast message) may be stored and implemented by the cellular device 506, while other aspects of the policy (for example, determining whether or not to provide a user alert, and the nature of that user alert, based on an indication of a cellular broadcast message) may be stored and implemented by the non-cellular device 508.

Note that according to various implementations, device discovery and policy configuration (such as described in steps 516 and 518) may be performed before or after a cellular broadcast message is received (such as described in step 512). For example, as one possibility, the cellular device 506 may actively 'pre-discover' any available non-cellular devices (such as non-cellular device 508) on a regular or irregular (occasional) basis, and configure cellular broadcast message policies for such devices in a proactive manner, such that if a cellular broadcast message is received, indications of that message may rapidly be distributed in a user-preferred (e.g., according to the policy, which may have been pre-configured by a user) manner. As another possibility, the cellular device 506 may perform device discovery only (or additionally) in response to receiving a cellular broadcast message. In such a case, the cellular device 506 might determine whether or not any non-cellular devices (such as non-cellular device 508) are available in a 'just-in-time' manner, and distribute indications of the cellular broadcast message to such devices according to an automatically configured (by default or based on user pre-configuration) policy.

In 520, the cellular device 506 may provide an indication of the first message to the non-cellular device 508, based on receiving the first message. The indication may also be provided based on discovering the non-cellular device 508 and configuring the policy for distributing indications of cellular broadcast messages to the non-cellular device 508. In particular, the indication may be provided in accordance with the policy for distributing indications of cellular broadcast messages to the non-cellular device 508 which was configured in step 518. For example, the first message may meet certain criteria (for example, may be of a specified cellular broadcast message type) for which the policy specifies that an indication of a message which meets those criteria is to be distributed to the non-cellular device 508 when such a message is received by the cellular device 506. As a further example, the indication may be of a nature specified by the policy for the cellular broadcast message type of the first message. For example, according to the policy, an indication which does not include the content of the first message and/or which does not interrupt or modify current activities or services being provided by the non-cellular device 508 might be distributed for 'traffic' type cellular broadcast messages, while an indication which does include the content of the first message and/or which interrupts or modify current activities or services being provided by the non-cellular device 508 might be distributed for 'severe weather' or 'imminent threat' type cellular broadcast messages.

The indication may be provided to the non-cellular device 508 via a network (e.g., a wireless local area network), and/or by means of any of a variety of other communication techniques, such as described hereinabove. The communication technique used to provide the indication may typically correspond to a communication technique by which the cellular device 506 and the non-cellular device 508 performed device discovery in step 516.

In 522, the non-cellular device 508 may provide a user alert. The nature of the user alert may depend on the nature of the non-cellular device 508, and more particularly may depend on the policy configured in step 518. For example, as one possibility, the user alert might include any cellular broadcast message specific alerting sound and/or vibration, and/or may include rendering the content of the first message, in a similar manner as if the non-cellular device 508 had directly received the first message via cellular broadcast.

As another possibility, the user alert may include utilizing specific service capabilities of the non-cellular device 508, and/or may include interrupting or modifying current activities of the non-cellular device 508. For example, an audio device which was playing audio might mute, pause, or adjust the volume of the audio and/or play an alert sound associated with the first message instead of or overlaid on the currently playing audio. As another example, a video device which is currently displaying an image or video might pause or modify the image or video and/or display a message (e.g., including textual content of the first message and/or an indication that the first message was received by the cellular device 506) overlaid on the currently displayed image or video. As a still further example, a printer might interrupt a current print job to print a message on one or more pages. A device which is capable of providing multiple services (e.g., an audiovisual device) might provide a user alert which utilizes some or all of the services which the device is capable of providing.

It should also be noted that in some cases, the non-cellular device 508 may be sleeping (e.g., in a low-power state) when the cellular device 506 receives the first message. In such a case, the cellular device 506 may or may not (e.g., depending on the policy and capabilities of the non-cellular device 508) wake the non-cellular device 508 to provide an indication of the first message to the non-cellular device 508.

Note that while the method of FIG. 5 is illustrated and described primarily with respect to the possibility of distributing indications of cellular broadcast messages from cellular device 506 to a single non-cellular device 508, it should be recognized that the cellular device 506 may be configured to distribute indications of cellular broadcast messages received at the cellular device 506 to multiple non-cellular devices 508. For example, the cellular device 506 may perform discovery and policy configuration for each of the multiple non-cellular devices 508, via one or more wireless or wired communication techniques. Similar or different indications of the first message might accordingly be provided to each of the multiple non-cellular devices 508, according to each respective policy of the multiple non-cellular devices 508; additionally, some or all of the non-cellular devices 508 may provide user alerts in response to the indications of the first message in different manners, e.g., again depending on the respective policy of each non-cellular device 508.

Thus, the method of FIG. 5 may be used to extend the reach and detectability of at least some cellular broadcast messages, such as emergency alert messages. Extending the detectability (e.g., visibility and audibility) of such messages may in turn significantly improve the effectiveness of such messages, since such messages may more rapidly be detected by those who might be affected by them, which may have a significant positive impact on public health, safety, and well-being. For example, even small amounts of additional warning in cases of particularly time-sensitive notifications, such as tornado or tsunami warnings, may have a disproportionately beneficial impact, up to and potentially including saving lives, on those who might be affected by events for which those notifications are generated.

As a further benefit, as previously noted the method of FIG. 5 may be used to distribute (forward) cellular broadcast messages to specific non-local devices (e.g., targeted non-cellular devices available via wide-area network), such as those of friends or family members. This may potentially provide a highly effective means of providing those friends or family members with an early alert of an event which might be relevant to a loved one.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a radio, comprising one or more antennas configured for wireless communication;
a processing element operably coupled to the radio;
wherein the radio and the processing element are configured to:
receive a first message via a cellular broadcast communication technique;
discover at least one device via a network;
configure a policy for distributing indications of cellular broadcast messages to the at least one discovered device, wherein the policy applies only to broadcast messages and includes a user-configurable option for whether or not to distribute the indications of cellular broadcast messages to the at least one discovered device; and
determine whether to provide an indication of the first message to the at least one device via the network based on receiving the first message and discovering the at least one device via the network, wherein the indication of the first message is provided in accordance with the policy for distributing indications of cellular broadcast messages;
wherein the wireless UE device is a portable device carried by a user.

2. The UE of claim 1, wherein discovering the at least one device comprises one or more of:
determining a device type of the at least one device; or
determining one or more services provided by the at least one device;
wherein the radio and the processing element are further configured to select an indication type of the indication of the first message from a plurality of possible indication types based at least in part on one or more of the determined device type or the determined one or more services.

3. The UE of claim 1,
wherein the radio and the processing element are further configured to provide content of the first message to the at least one device via the network as part of the indication of the first message.

4. The UE of claim 1,
wherein the indication of the first message is configured to interrupt or modify one or more activities of the at least one device.

5. The UE of claim 1,
wherein the policy indicates whether or not to wake the at least one device to provide the indications of the cellular broadcast messages.

6. The UE of claim 1,
wherein the first message is a multi-part message,
wherein the cellular broadcast communication technique is Short Message Service-Cell Broadcast (SMS-CB),
wherein receiving the first message comprises receiving a plurality of SMS-CB transmissions, each transmission comprising a portion of the first message.

7. The UE of claim 1, wherein the antenna and the processing element are further configured to:
receive user input, wherein the user input indicates whether or not to wake the at least one device to provide indications of cellular broadcast messages if the at least one device is in a sleeping state.

8. A method for a portable cellular device to distribute messages received via cellular broadcast, the method comprising:
receiving at the portable cellular device a first message via a cellular broadcast communication technique;
discovering a non-cellular device via non-cellular communication;
configuring a policy for distributing indications of cellular broadcast messages to the discovered non-cellular device, wherein the policy applies only to cellular broadcast messages and includes a user-configurable option for whether or not to distribute the indications of cellular broadcast messages to the discovered non-cellular device; and
determining whether to provide an indication of the first message to the non-cellular device via non-cellular communication based on receiving the first message and discovering the non-cellular device, wherein the indication of the first message is provided in accordance with the policy for distributing indications of cellular broadcast messages to the non-cellular device.

9. The method of claim 8, wherein the policy indicates one or more of:
a type of indication to be provided to the non-cellular device for cellular broadcast messages; or
whether or not to wake the non-cellular device to provide indications of cellular broadcast messages if the non-cellular device is in a sleeping state.

10. The method of claim 8, wherein the policy indicates one or more of:
whether or not to provide indications of each of a plurality of types of cellular broadcast messages to the non-cellular device;
a type of indication to be provided to the non-cellular device for each of a plurality of types of cellular broadcast messages; or
whether or not to wake the non-cellular device to provide indications of each of a plurality of types of cellular broadcast messages if the non-cellular device is in a sleeping state.

11. The method of claim 8, the method further comprising:
discovering a plurality of non-cellular devices,
configuring a policy for distributing indications of cellular broadcast messages to each respective non-cellular device of the plurality of non-cellular devices; and
providing different indications of the first message to at least some of the plurality of non-cellular devices based on their respective policies.

12. The method of claim 8,
wherein discovering the non-cellular device is performed via one or more of Bonjour or Universal Plug and Play (UPnP).

13. The method of claim 8,
wherein discovering the non-cellular device is performed over a wireless local area network (WLAN).

14. The method of claim 8,
wherein discovering the non-cellular device is performed over a wide area network,
wherein discovering the non-cellular device and configuring the policy for distributing indications of cellular broadcast messages to the non-cellular device comprises receiving user input indicating an internet protocol (IP) address of the non-cellular device and receiving user input requesting distribution of cellular broadcast messages received at the cellular device to the non-cellular device.

15. An electronic device, comprising:
an antenna configured for wireless communication;
a processing element operably coupled to the antenna;
wherein the antenna and the processing element are configured to:
discover a wireless user equipment (UE) device via wireless communication;
receive user input configuring a policy for reacting to indications of cellular broadcast messages, wherein the policy for reacting to indications of cellular broadcast messages applies only to cellular broadcast messages and includes a user-configurable option for whether or not to distribute the indications of cellular broadcast messages to the discovered wireless UE device;
receive an indication of a first message from the UE via wireless communication, wherein the first message is received by the UE via a cellular broadcast communication technique; and
determine whether to provide a user alert in response to receiving the indication of the first message, wherein the user alert is provided according to the policy for reacting to indications of cellular broadcast messages;
wherein the electronic device is a handheld device carried by a user.

16. The electronic device of claim 15,
wherein the indication of the first message includes the first message,
wherein providing the user alert comprises providing the first message via a user interface.

17. The electronic device of claim 15,
wherein the user input configuring the policy for reacting to indications of cellular broadcast messages is received via a user interface provided by the electronic device.

18. The electronic device of claim 15,
wherein the user input configuring the policy for reacting to indications of cellular broadcast messages is received by the electronic device from the UE via wireless communication.

19. The electronic device of claim 15, wherein the user alert comprises one or more of:
muting or adjusting a volume of audio currently playing on the electronic device;
providing an audible alert sound associated with the first message;
pausing or modifying an image or video currently displayed on a display of the electronic device;
displaying an indication that the first message has been received by the UE;
displaying the first message; or
printing the first message.

20. The electronic device of claim 15, wherein the antenna and the processing element are further configured to:
wake from a sleeping state in response to receiving the indication of the first message.

* * * * *